(12) United States Patent
Prayaga

(10) Patent No.: US 11,861,479 B2
(45) Date of Patent: Jan. 2, 2024

(54) DIGITAL PERSONAL ASSISTANT WITH CONFIGURABLE PERSONALITY

(71) Applicant: FORD GLOBAL TECHNOLOGIES, LLC, Dearborn, MI (US)

(72) Inventor: Shyamala Prayaga, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 16/995,663

(22) Filed: Aug. 17, 2020

(65) Prior Publication Data

US 2022/0051071 A1 Feb. 17, 2022

(51) Int. Cl.
  *G06N 3/006* (2023.01)
  *B60R 11/02* (2006.01)
  *G10L 15/22* (2006.01)

(52) U.S. Cl.
  CPC .......... *G06N 3/006* (2013.01); *B60R 11/0241* (2013.01); *G10L 15/22* (2013.01); *G10L 2015/223* (2013.01)

(58) Field of Classification Search
  CPC ..... G06N 3/006; B60R 11/0241; G10L 15/22; G10L 2015/223
  See application file for complete search history.

(56) References Cited

U.S. PATENT DOCUMENTS

| | | | |
|---|---|---|---|
| 9,489,625 B2 | 11/2016 | Kalns et al. | |
| 9,965,553 B2 | 5/2018 | Lyren | |
| 2015/0186156 A1* | 7/2015 | Brown | H04L 51/02 715/706 |
| 2019/0221225 A1* | 7/2019 | Bricklin | G10L 13/033 |
| 2019/0354594 A1 | 11/2019 | Foster et al. | |

* cited by examiner

*Primary Examiner* — Robert J Michaud
(74) *Attorney, Agent, or Firm* — Joseph Zane; Brooks Kushman P.C.

(57) ABSTRACT

Auto-generation of dialog for a skill executed by a digital assistant is performed. Details descriptive of a digital assistant persona are received from a personality studio user interface. A personality type is generated based on the details. A standard vocabulary is auto-generated using the personality type. The standard vocabulary is exported for use in a skill. Prompts are auto-generated for the skill based on the standard vocabulary.

20 Claims, 20 Drawing Sheets

A Web Page https://www.avdapotral.ford.com

Personality Studio

< Create a Personality

Cancel 424  Save 422

402 Personality Name *Enter text here*
Age *Enter text here*
Gender [Female] Male

Personality Register 406 — Dominant, challenging, leading, opposing, helping, Averse, defying, co-operating, Friendly, avoiding, servicing — Submissive

Service Tasks 412
Add up to 5
*Enter text here*

Persuasive Tasks 414
Add up to 5
*Enter text here*

Backstory 404
*Enter text here*

Personality Type 408
Select up to 5
Trait 1  Trait 2  Trait 3
Trait 4  Trait 5  Trait 6

Character Traits 410
Select up to 5
Trait 1  Trait 2  Trait 3
Trait 4  Trait 5  Trait 6

Tone of the voice 416
Add up to 5
*Enter text here*

Speaking Style 418
Add up to 5
*Enter text here*

Sample Dialogs 420

A Web Page

← → × ⌂ https://www.avdapotral.ford.com

≡ Personality Studio

‹ Eave Standard Vocabulary

[ Export to Project ]
608

⚪ Tune Prompts
604

| Introduction | Apologies | Explicit Confirmation | Implicit Confirmation | Greetings | Acknowledgment |

606

Introduction
First time users

"Hello, I am Eave, your museum assistant. What can I do for you, ticket booking, giving museum information, giving directions to the museum or something else?"

"Hello, my name is Eave. I can do ticket booking, give museum information, give directions to the museum and more. How can I help you?"

"<Good morning>, I am your museum assistant, Eave. Ticket booking, giving museum information and giving directions are a few of the many things I can do. How can I help you?"

602

Introduction
Returning users

"<Good morning>, what can I do for you, ticket booking, giving museum information or something else?"

"Welcome back, how can I help? Tickets, museum information or something else?"

"How can I help you today?"

*FIG. 6*

A Web Page https://www.avdapotral.ford.com

☰ Customize Small Talks     Cancel | Save |

< Back     About the Assistant

DA Responses     ⊙ Switch to SSML Editor

"Hello, I am Eddy, your museum assistant. What can I do for you, ticket booking, giving museum information, giving directions to the museum or something else?"

"Hello, my name is Eave. I can do ticket booking, give museum information, give directions to the museum and more. How can I help you?"  ⊖  902

"<Good morning>, I am your museum assistant, Eddy. Ticket booking, giving museum information and giving directions are a few of the many things I can do. How can I help you?"  ⊖

| Utterance Phrase | ▼ Added | |
|---|---|---|
| "How do I pullover? | Now | 🗑 |
| "I need help with pullover? | An hour ago | 🗑 |
| "Can you pullover? | Now | 🗑 |
| "What is the process to pullover? | Now | 🗑 |
| "Can I make emergency stops? | Now | 🗑 |
| "Pullover please? | Now | 🗑 |

[⊕ Add question variant]   [Import Questions]   [Show Recommendations]

FIG. 9

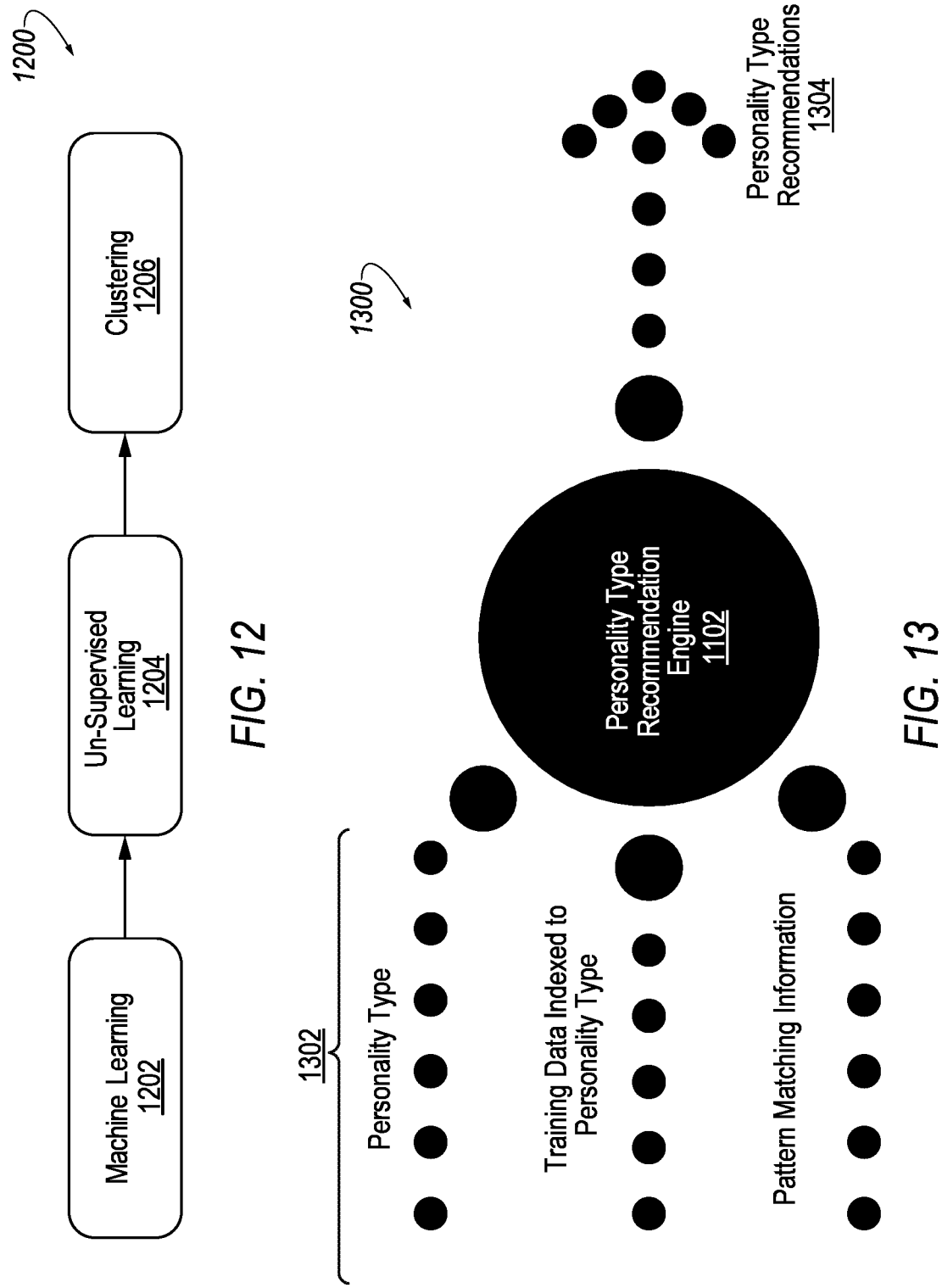

1402

| Personality Type | Characters | Communication Style | Strengths | Cognitive Functions | Hobbies & Interests | Famous people with the personality type |
|---|---|---|---|---|---|---|
| ESFJ - Extraverted, Sensing, Feeling, Judging<br><br>Practical, realistic, matter-of-fact. Decisive, quickly move to implement decisions. Organize projects and people to get things done, focus on getting results in the most efficient way possible. Take care of routine details. Have a clear set of logical standards, systematically follow them and want others to also. Forceful in implementing their plans | In addition to deriving pleasure from helping others, ESFJs also have a need for approval. They expect their kind and giving ways to be noticed and appreciated by others.<br><br>ESFJs also have a strong desire to exert control over their environment. Organizing, planning, and scheduling help people with this personality type feel in command of the world around them.<br><br>ESFJs are naturally geared toward understanding other people. They are careful observers of others and are adept at supporting and bringing out the best in people. | In communication, ESFJs are practical, concrete, and at the same time supportive and responsive toward the needs of the other party. They are certain of their reasoning and they want others to share it.<br><br>ESFJs keep to a soft, but assertive communication style. They are clear sticklers to following communication standards and rules accepted in their circle or community. | Strong practical skills.<br><br>Warm and sensitive.<br><br>Loyal and dutiful.<br><br>Stand up and be counted.<br><br>Kind and loyal<br><br>Outgoing<br><br>Organized<br><br>Practical and dependable<br><br>Enjoys helping others | ESFJs tend to make decisions based on personal feeling, emotions, and concern for others. They tend to think more about the personal impact of a decision rather than considering objective criteria.<br><br>ESFJs tend to judge people and situations based upon their "gut feelings." They often make snap decisions as a result and are quick to share their feelings and opinions. This tendency can be great in some ways, as it allows them to make choices rather quickly.<br><br>ESFJs are more focused on the present than on the future. They are interested in concrete, immediate details rather than abstract or theoretical information. | Popular leisure activities for ESFJs include volunteering in community, charity, or religious organizations; celebrating holidays and family traditions; cooking; entertaining; and social sports. | • Martha Stewart<br>• Dave Thomas<br>• Sam Walton<br>• Barbara Walters,<br>• William Howard Taft<br>• JC Penney<br>• Sally Field<br>• Mary Tyler Moore<br>• Ray Kroc<br>• Anne Hathaway<br>• Alicia Keys<br>• Bill Clinton<br>• Prince William,<br>• Duke of Cambridge<br>• Pope Francis<br>• William McKinley<br>• Danny Glover<br>• Terry Bradshaw |

FIG. 15

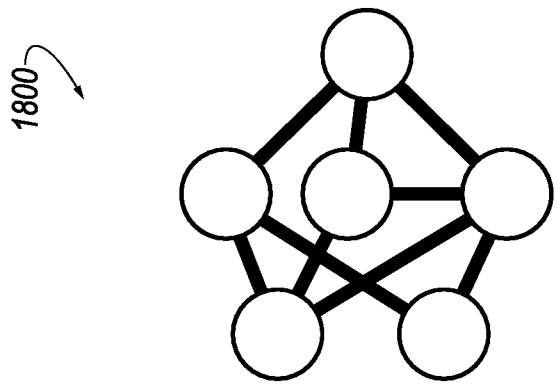
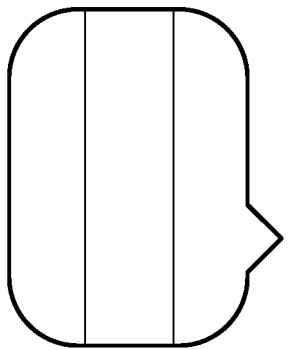
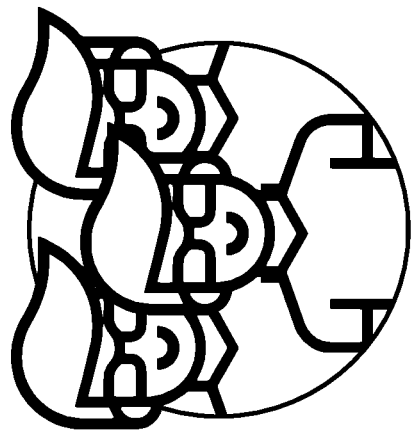
Train the data with neural network algorithms
Speaking Style pattern recognition (Identify commonalities in choices of words etc.)
Multiple Famous celebrities with the same personality type
FIG. 18

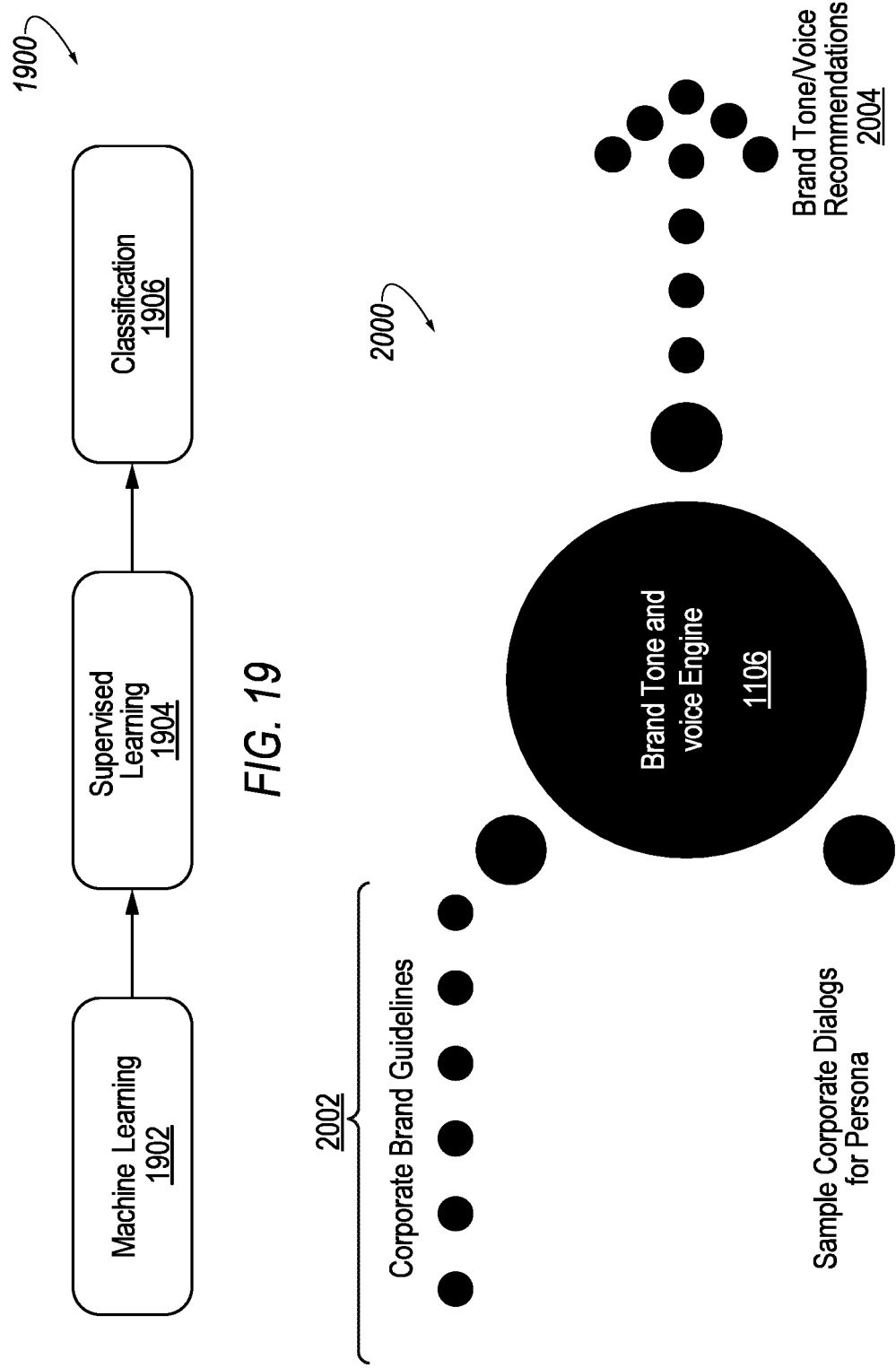

DIGITAL PERSONAL ASSISTANT WITH CONFIGURABLE PERSONALITY

TECHNICAL FIELD

Aspects of the disclosure relate to a digital assistant with a configurable personality.

BACKGROUND

A digital assistant is a computer program designed to assist a user with various computerized tasks using voice commands. The digital assistant may do this by listening to a user command and answering questions. To activate a digital assistant, a user may say a predefined word or phrase, sometimes referred to as a wake word. In other examples, a user may press a button or other control to activate the digital assistant.

SUMMARY

In one or more illustrative examples, a system for auto-generation of dialog for a skill executed by a digital assistant, includes a server programmed to receive details descriptive of a digital assistant persona from a personality studio user interface; generate a personality type based on the details; auto-generate a standard vocabulary using the personality type; export the standard vocabulary for use in a skill; and auto-generate prompts for the skill based on the standard vocabulary.

In one or more illustrative examples, a method for auto-generation of dialog for a skill executed by a digital assistant, includes receiving details descriptive of a digital assistant persona from a personality studio user interface; generating a personality type based on the details; auto-generating a standard vocabulary using the personality type; exporting the standard vocabulary for use in a skill; and auto-generating prompts for the skill based on the standard vocabulary.

In one or more illustrative examples, a non-transitory computer-readable medium comprising instructions that, when executed by a computing device, cause the computing device to perform auto-generation of dialog for a skill executed by a digital assistant, including to receive details descriptive of a digital assistant persona from a personality studio user interface; generate a personality type based on the details; auto-generate a standard vocabulary using the personality type; export the standard vocabulary for use in a skill; and auto-generate prompts for the skill based on the standard vocabulary.

BRIEF DESCRIPTION OF THE DRAWINGS

FIG. 4 illustrates an example personality studio user interface in accordance with an embodiment of the disclosure;

FIG. 6 illustrates an example of a standard vocabulary generated based on the personality type and other user input;

FIG. 9 illustrates an alternate example of auto-generated content for a skill;

FIG. 12 illustrates an example of an un-supervised machine learning approach;

FIG. 13 illustrates an example application of the un-supervised machine learning approach to the personality type recommendation engine;

FIG. 15 illustrates an example of details of the lookup table for a specific personality type;

FIG. 18 illustrates an example of un-supervised learning performed by the personality type recommendation engine;

FIG. 19 illustrates an example of a supervised machine learning approach;

FIG. 20 illustrates an example of an application of the supervised machine learning approach to the brand tone and voice engine;

DETAILED DESCRIPTION

Figure 1:
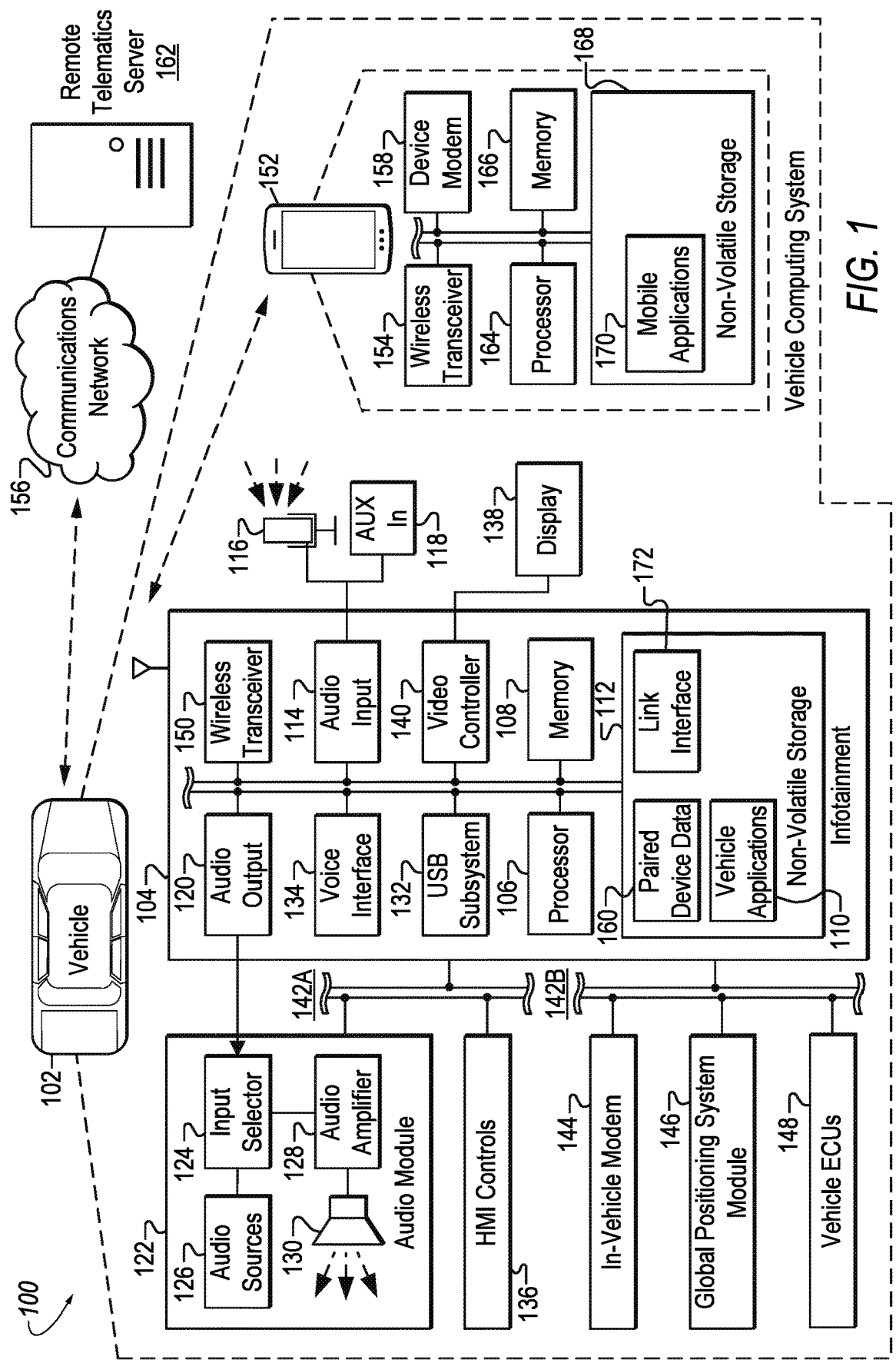
FIG. 1 illustrates an example diagram of a system configured to provide digital assistant services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Human beings tend to develop a first impression of a person based on voice. In other words, when users listen to speech, they quickly form an opinion about the speaker. This may occur for speech from a digital assistant as well. When a digital assistant is talking to the user to perform tasks or answer queries, the user may also form an opinion of the digital assistant. This may be particularly relevant to digital assistants, as the digital assistant may be perceived like an employee of a company representing the company's brand. It would be beneficial for the user to connect with the digital assistant personality. That connection may automatically affect the ongoing utility and trust that the user places in the company overall.

A digital assistant persona may make a good impression to the user through demonstration by the digital assistant of traits other than expertise and knowledge. These traits may include personality traits such as reliability, helpfulness, kindness, friendliness and resourcefulness. A goal of a virtual assistant is to establish user trust, engagement, and satisfaction with a brand. Thus, for brand awareness, it is beneficial for the virtual assistant to exude a digital assistant persona that is pleasant to the user. Elements such as intensity, frequency, pace, intonation, quality, melody, harmony, rhythm, etc. may influence the way users perceive the brand.

Digital assistant personality includes of the choice of words, characteristics traits, and tone of voice. A combination of these may be used to create a standard vocabulary for a digital assistant. This standard vocabulary then helps create the prompts a digital assistant would say for the command. Creating the standard vocabulary for digital assistant and writing voice prompts is a tedious effort and requires specialized skill sets. This task is further complicated by a desire to provide prompts that help the user to connect with the personality of the digital assistant. By automating the process of personality development through artificial intelligence and machine learning techniques, a standard vocabulary may be generated which then will help use develop voice prompts for common tasks. This automated approach to digital assistant design saves significant time and effort, as well as aids in producing a personality that is engaging to the user.

As discussed in detail herein, four recommendation engines may work together to automatically generate the standard vocabulary and voice prompts. These engines include (i) a personality type recommendation engine, (ii) a standard vocabulary recommendation engine, (iii) a brand tone and voice engine, and (iv) an analytics engine.

Basic information may be input in the personality studio interface about the desired digital assistant persona. Based on the input, the personality recommendation engine automatically performs pattern matching between the inputs and the output of the recommendation engine and generates a personality type (e.g., from the 16 Myers and Briggs personality types), as well as a standard vocabulary based on the learning data that is collected and trained.

Regarding the personality type recommendation engine, a combination of machine learning techniques may be used to develop the personality type. The personality type recommendation engine may generate base information according to personality type in combination with collected web data for each personality type, which may include data with respect to speaking style, choice of words, and tone of voice.

The brand tone and voice engine may receive inputs from the corporate branding guidelines on tone of voice, choice of words, and overall corporate value and personality. The brand tone and voice engine may also receive the digital assistant personality type generated using personality studio to further refine the standard vocabulary.

The standard vocabulary recommendation engine may receive inputs from the personality type recommendation engine, the brand tone and voice engine and any analytics data captured (prompt edits, user testing inputs, etc.) to develop a standard vocabulary recommendation. This will be used to generate a standard vocabulary for digital assistant. When the user creates a skill and input the intent or user utterances, the standard vocabulary may be used to auto-generate the voice prompts. Further details are discussed in detail herein.

FIG. 1 illustrates an example diagram of a system 100 configured to provide digital assistant services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, MI It should be noted that the illustrated system 100 is merely an example, and more, fewer, and/or differently located elements may be used.

The infotainment system 104 may include one or more processors 106 configured to perform instructions, commands and other routines in support of the processes described herein. For instance, the infotainment system 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the infotainment system 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The infotainment system 104 may be provided with various features allowing the vehicle occupants to interface with the infotainment system 104. For example, the infotainment system 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The infotainment system 104 may also provide one or more audio outputs 120 to an input of an audio module 122 having audio playback functionality. In other examples, the infotainment system 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the infotainment system 104, such as audio content generated by the infotainment system 104, audio content decoded from flash memory drives connected to a universal serial bus (USB) subsystem 132 of the infotainment system 104, and audio content passed through the infotainment system 104 from the auxiliary audio input 118.

The infotainment system 104 may utilize a voice interface 134 to provide a hands-free interface to the infotainment system 104. The voice interface 134 may support speech recognition from audio received via the microphone 116 according to grammar associated with available commands, and voice prompt generation for output via the audio module 122. The voice interface 134 may utilize probabilistic voice recognition techniques using the grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the infotainment system 104 and another audio source 126 is selected for playback.

The infotainment system 104 may also receive input from human-machine interface (HMI) controls 136 configured to provide for occupant interaction with the vehicle 102. For instance, the infotainment system 104 may interface with one or more buttons or other HMI controls configured to invoke functions on the infotainment system 104 (e.g., steering wheel audio buttons, a push-to-talk button, instrument panel controls, etc.). The infotainment system 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The infotainment system 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the infotainment system 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the infotainment system 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the infotainment system 104 over a first in-vehicle network 142-A, and the vehicle modem 144, GPS module 146, and vehicle ECUs 148 may communicate with the infotainment system 104 over a second in-vehicle network 142-B. In other examples, the infotainment system 104 may be connected to more or fewer in-vehicle networks 142. Additionally or alternately, one or more HMI controls 136 or other components may be connected to the infotainment system 104 via different in-vehicle networks 142 than shown, or directly without connection to an in-vehicle network 142.

The infotainment system 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the infotainment system 104. In many examples, the infotainment system 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the infotainment system 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the infotainment system 104 may be identified by the infotainment system 104 according to paired device data 160 maintained in the storage medium 112. The paired device data 160 may indicate, for example, the unique device identifiers of mobile devices 152 previously paired with the infotainment system 104 of the vehicle 102, secret information shared between the paired device and the infotainment system 104 such as link keys, and/or personal identification numbers (PINs), and most recently used or device priority information, such that the infotainment system 104 may automatically reconnect to the mobile devices 152 matching data in the paired device data 160 without user intervention.

When a mobile device 152 that supports network connectivity is connected to the infotainment system 104, the mobile device 152 may allow the infotainment system 104 to use the network connectivity of the device modem 158 to communicate over the communications network 156 with the remote telematics server 162 or other remote computing device. In one example, the infotainment system 104 may utilize a data-over-voice plan or data plan of the mobile device 152 to communicate information between the infotainment system 104 and the communications network 156. Additionally or alternately, the infotainment system 104 may utilize the vehicle modem 144 to communicate information between the infotainment system 104 and the communications network 156, without use of the communications facilities of the mobile device 152.

Similar to the infotainment system 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the infotainment system 104 via the wireless transceiver 154 and with the remote telematics server 162 or other network services via the device modem 158. The infotainment system 104 may also include a device link interface 172 to facilitate the integration of functionality of the mobile applications into the grammar of commands available via the voice interface 134. The device link interface 172 may also provide the mobile applications with access to vehicle functions and information available to the infotainment system 104 via the in-vehicle networks 142. An example of a device link interface 172 may be the SYNC APPLINK component of the SYNC system provided by The Ford Motor Company of Dearborn, MI.

Figure 2:
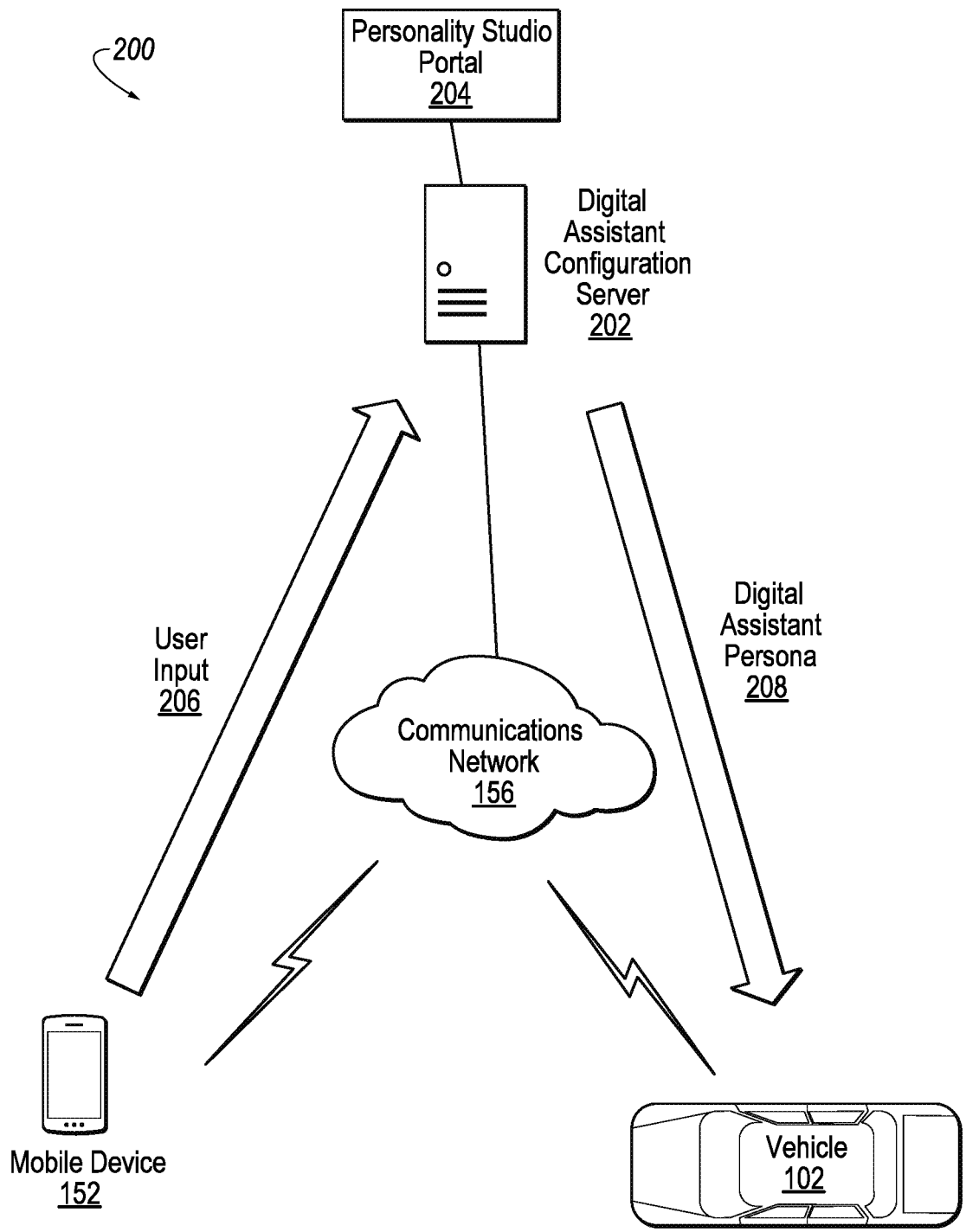
FIG. 2 illustrates an example system for the application of a customized digital assistant persona to the vehicle.

FIG. 2 illustrates an example system 200 for the application of a customized digital assistant persona 208 to the vehicle 102. As shown, a user may utilize the mobile device 152 (or another network-enabled computing device) to provide user input 206 to a personality studio portal 204 over the communications network 156 to a digital assistant configuration server 202. The digital assistant configuration server 202 may generate the customized digital assistant persona 208 responsive to the user input 206 and may provide the digital assistant persona 208 to the vehicle 102 for use by the infotainment system 104.

Similar to as discussed above with respect to the remote telematics server 162, the digital assistant configuration server 202 may include various types of computing apparatus including a memory on which computer-executable instructions may be maintained, where the instructions may be executable by one or more processors of the device.

The personality studio portal 204 may be an application or library included on the storage of or otherwise accessible by the digital assistant configuration server 202. The personality studio portal 204 may provide, to a user of the mobile device 152, a user interface provided by the digital assistant configuration server 202. To do so, the digital assistant configuration server 202 may be configured to maintain the personality studio portal 204 accessible to the mobile device 152 (or other devices) over the communications network 156. In an example, the digital assistant configuration server 202 may be configured to provide the personality studio portal 204 by using a web server application. As another possibility, the digital assistant configuration server 202 may execute a dedicated server application that may be accessed by a dedicated client application of a connecting device to provide the personality studio portal 204. As explained in detail herein, the personality studio portal 204 may be configured to allow the user to access, view, and update aspects of the digital assistant persona 208.

The user input 206 may include the input of various information to the mobile device 152 in support of the controlled operation of the personality studio portal 204. The user input 206 may be provided by answering questions indicated by the personality studio portal 204, e.g., through the selections of options and/or textual input. This input may take various forms, such as touch input to a screen of the mobile device 152, and/or audio input received to a microphone of mobile device 152 and transcribed into text.

Figure 3:
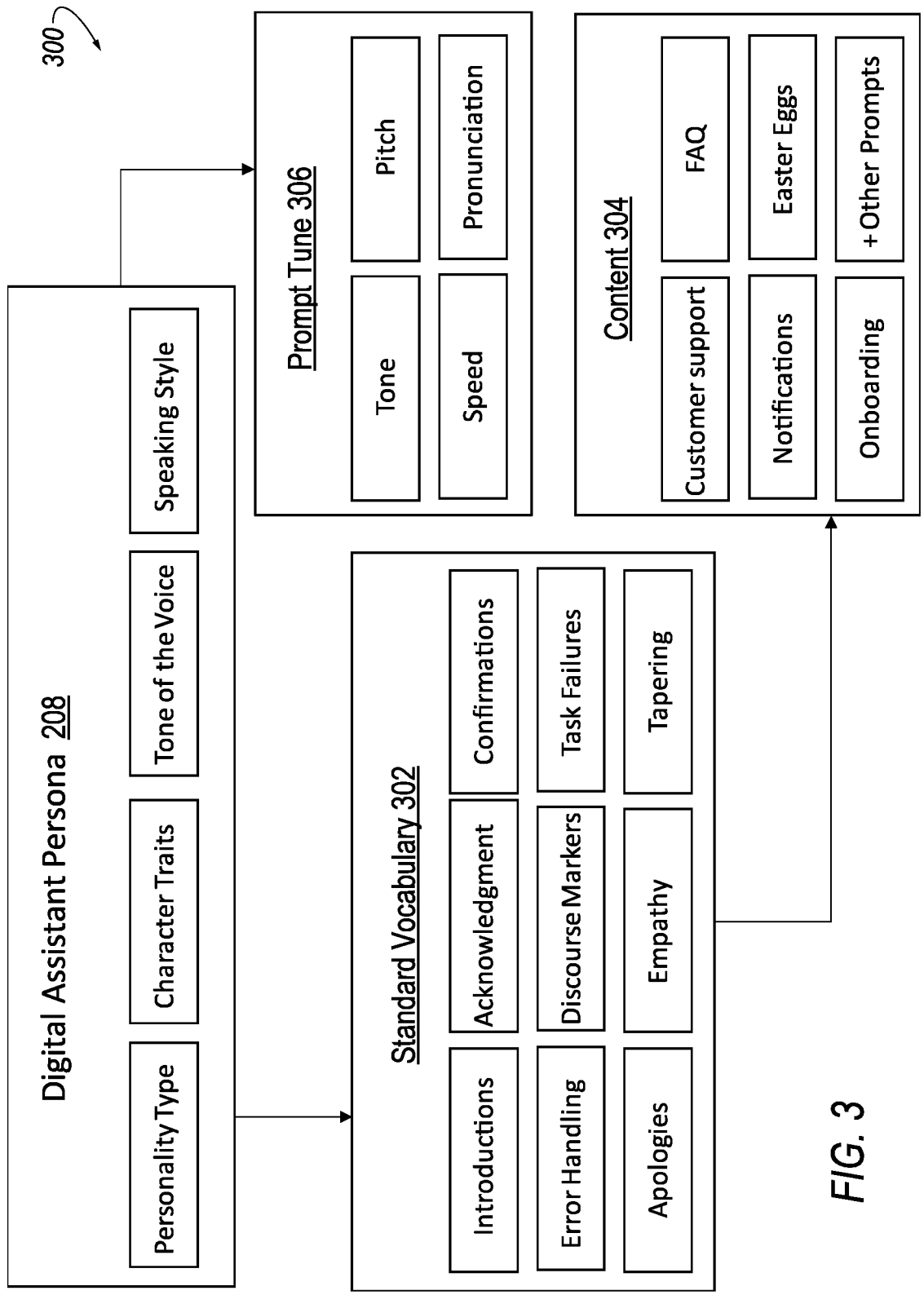
FIG. 3 illustrates an example of information defined by a digital assistant persona.

The digital assistant persona 208 may include various information to allow a digital assistant to provide a digital assistant having a predefined personality. Referring to FIG. 3, this persona-defining information may include data regarding personality type, character traits, tone of voice, and/or speaking style.

The digital assistant persona 208 may be used as an aid in defining a standard vocabulary 302. The standard vocabulary 302 includes various elements that make up a spoken or displayed prompt from a digital assistant to a user. These elements may include, as some examples, introductions, acknowledgments, confirmations, error handling, discourse markers, unsuccessful task indications, apologies, empathy, tapering questions, and confirmations.

The standard vocabulary 302 may be useful for the generation of content 304. Skills may refer to individual bots or applications that are focused on specific types of tasks. Some skills require access to a knowledge base. The standard vocabulary 302 of the digital assistant persona 208 helps select content 304 that follow the persona of the digital assistant across different skills. These skills may include, as some examples, customer support, frequently asked questions (FAQs), notifications, Easter eggs, onboarding, etc.

The digital assistant persona 208 may also be used as an aid in defining a prompt tune 306 for the digital assistant. As compared to the content 304, which relates to the substance of what information is provided by the digital assistant, the prompt tune 306 instead relates to how the information is spoken. As some examples, the prompt tune 306 may include information indicative of aspects of the speech of the digital assistant such as tone, pitch, speed, and pronunciation.

FIG. 4 illustrates an example personality studio user interface 400 in accordance with an embodiment of the disclosure. The personality studio user interface 400 may be provided to a user accessing the personality studio portal 204, as mentioned above. In general, the personality studio user interface 400 is configured to present an approach that allows the user to define aspects of the digital assistant persona 208. The personality studio user interface 400 may be a cloud-based solution which leverages artificial intelligence and machine learning techniques to auto generate prompts based on the user request type. The personality studio user interface 400 may include a plurality of categories of configurable information. In the illustrated example, these categories include general information 402, a backstory 404, a personality register 406, a personality type 408, character traits 410, service tasks 412, persuasive tasks 414, tone of voice 416, speaking style 418, and sample dialog 420.

The general information 402 may include basic details about the digital assistant, such as name, age, and gender. The general information 402 may also include one or more images of the digital assistant, which may be used in user interfaces, for example, to identify who is communicating.

The backstory 404 may include background information about the character of the digital assistant. This may include, for example, a fictitious background relating to where the persona of the digital assistant was born, raised, attended school, siblings, and so on.

The personality register 406 may include information indicative of personality aspects of the digital assistant. For instance, the personality register 406 may allow for selection of aspects such as whether the persona of the digital assistant is dominant or submissive, and whether the persona is friendly or averse.

Personality traits describe one's public, external behavior, while character traits describe one's private, internal compass. The personality type 408 may allow for the selection of various personality traits that the persona of the digital assistant may be chosen to have. The personality traits refer to other skills besides expertise and knowledge that may be used by the digital assistant to gain user trust. Some examples of such traits are to be reliable, helpful, kind, friendly, and/or resourceful. The character traits 410 may similarly allow for the selection of various character traits that the persona of the digital assistant may be chosen to have. Some example character traits may be to be honest, brave, compassionate, a leader, courageous, unselfish, and/or loyal.

The service tasks 412 may include a listing of one or more service tasks that the digital assistant may be defined to perform. Similarly, the persuasive tasks 414 may include a listing of one or more persuasive tasks that the digital assistant may be defined to perform.

The tone of voice 416 may include information indicative of the tone of voice that may be used by the digital assistant. The tone of voice may incorporate elements such as intensity, frequency, pace, intonation, quality, melody, harmony, rhythm. These elements may influence the way a user perceives a brand based on how it sounds.

The speaking style 418 refers to the intonation and speaking style of the digital assistant. For example, a male voice or a female voice may be chosen, or a voice with an English accent or a Southern accent may be chosen. What voice to choose may depends on the tasks being performed as well as the expectations of the user. The speaking style 418 may also include choice of words relates to whether one word or phrase or another word or phrase with similar meaning is used. The choice of words also provides clues to personality, as users often perceive a speaker differently based on how the speaker talks.

The sample dialog 240 may include example conversation between the digital assistant and users. These sample dialogs 240 may be useful in establishing rapport with the users, and may be based on the other personality information described via the personality studio user interface 400.

The user may utilize the personality studio user interface 400 to access, view, and update these aspects of the digital assistant persona 208. If the user makes any additions, changes, or updates, the user may select a save control 422 to apply those changes to the system. If the user wishes to discard any changes, the user may select a cancel control 424.

Responsive to receiving input that is saved via the save control 422, the personality studio portal 204 creates a personality type for the user. In one example, this personality type is based on the Myers and Briggs sixteen personality types. In Myers and Briggs, these sixteen personality types are based on four independent factors that are used to categorize personalities: (i) introversion vs. extraversion; (ii) sensing vs. intuition; (iii) thinking vs. feeling; and (iv) judging vs. perceiving.

The introversion vs. extraversion factor describes how a person manages their energy. Introverts spend quiet time alone or with a small group, and are reserved and thoughtful. Extraverts spend time with people and in busy, active surroundings, and tend to be more expressive and outspoken. The sensing vs. intuition factor describes how an individual processes information. Sensors focus on their five senses and tend to be hands-on learners and are often described as practical. Intuitives focus on a more abstract level of thinking, are more interested in theories, patterns, and explanations, and are often more concerned with the future than the present and are often described as creative. The thinking vs. feeling factor describes how people make decisions. Thinkers are interested in finding the most logical, reasonable choice, while feelers tend to make decisions with their hearts. The judging vs. perceiving factors describes how people approach structure in their lives. Judgers appreciate structure and order and dislike last-minute changes, while perceivers appreciate flexibility and spontaneity and minds open to change. The sum of a person's four preferred styles may be referred to as their personality type.

Figure 5:
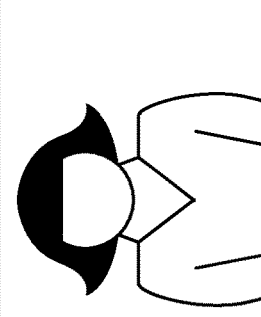
FIG. 5 illustrates an example of a personality type generated based on user input to the personality studio user interface.

FIG. 5 illustrates an example 500 of a personality type generated based on user input 206 to the personality studio user interface 400. As shown in the generated text 502, the personality type includes information about the personality and characteristics of the potential digital assistant personal 208. Some of the information in the generated personality type may relate to which of the sixteen personality types is indicated by the user input 206, while other content may relate to specifics provided by the user, e.g., backstory. The user may customize the generated text 502 by pressing the edit control 504. Once the user is satisfied with the generated text 502, the user may select the generate standard vocabulary control 506 to cause the generation of the standard vocabulary 302 to be performed by the personality studio portal 204.

FIG. 6 illustrates an example 600 of a standard vocabulary 302 generated based on the personality type and other user input 206. As noted above, the standard vocabulary 302 includes prompts for various categories such as introductions, acknowledgments, confirmations, error handling, discourse markers, unsuccessful task indications, apologies, empathy, tapering questions, and confirmations. A portion of the introductions of a standard vocabulary 302 are illustrated in the example 600. These elements of the standard vocabulary 302 as shown may be editable by the user, for instance in edit controls 602 if the user chooses to tune the prompts at 604. It can also be seen that the user may select from a selector control 606 to view of the categories, such as apologies, explicit confirmations, implicit confirmations, greetings, acknowledgements, etc. Once the user is satisfied with the standard vocabulary 302, the standard vocabulary 302 may be exported to a project responsive to selection of the export control 608.

Figure 7:
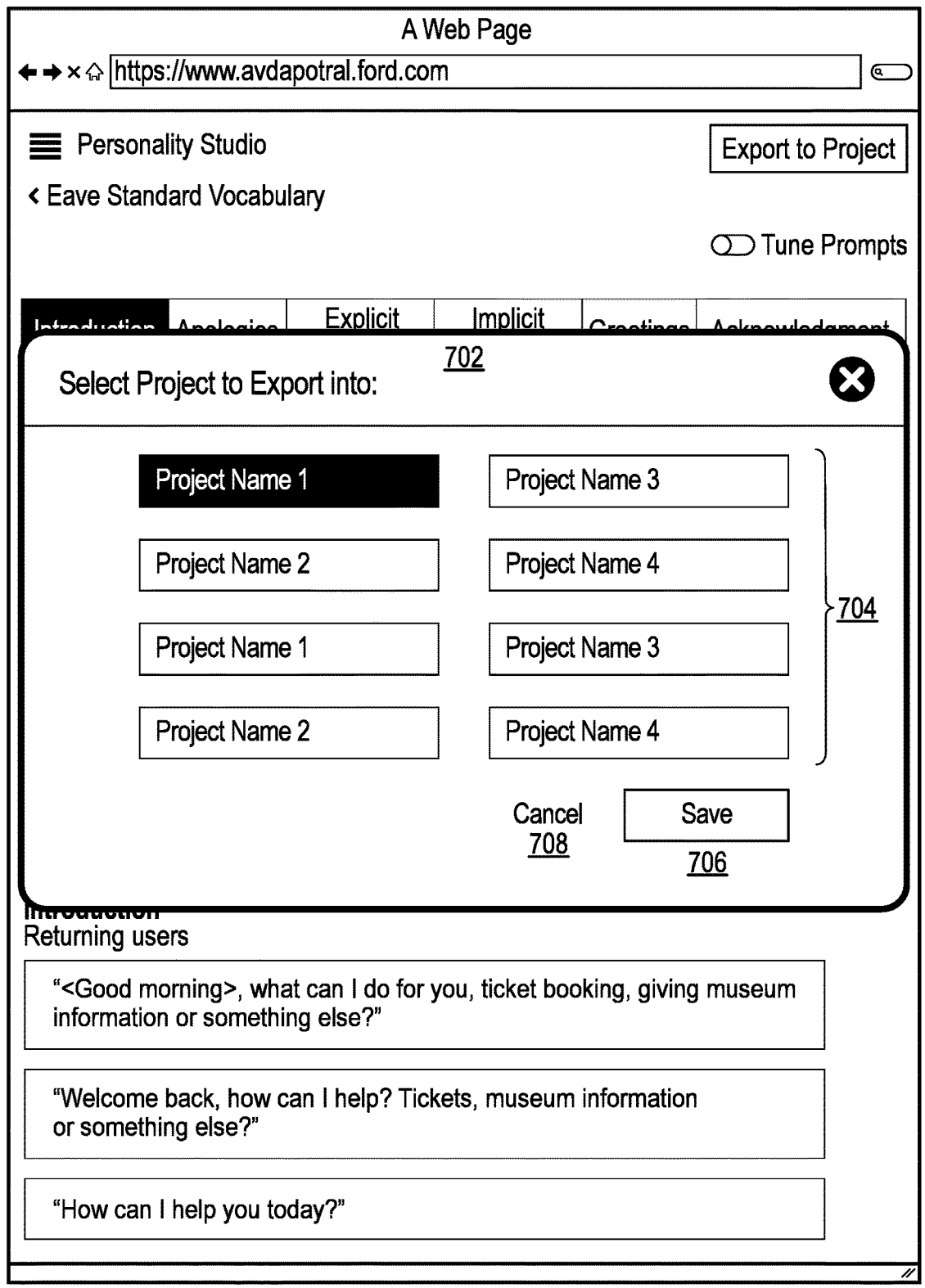
FIG. 7 illustrates an example export screen provided responsive to selection to export the standard vocabulary.

FIG. 7 illustrates an example 700 including an export screen 702 provided responsive to selection to export the standard vocabulary 302. As shown, the export screen 702 allows the user to select projects 704 into which the standard vocabulary 302 and personality information can be exported into. If the user elects to continue with the export, the user may select the save control 706. Or, if the user wishes to abandon the export, the user may select the cancel control 708, reverting back to the user interface of the example 600.

Figure 8:
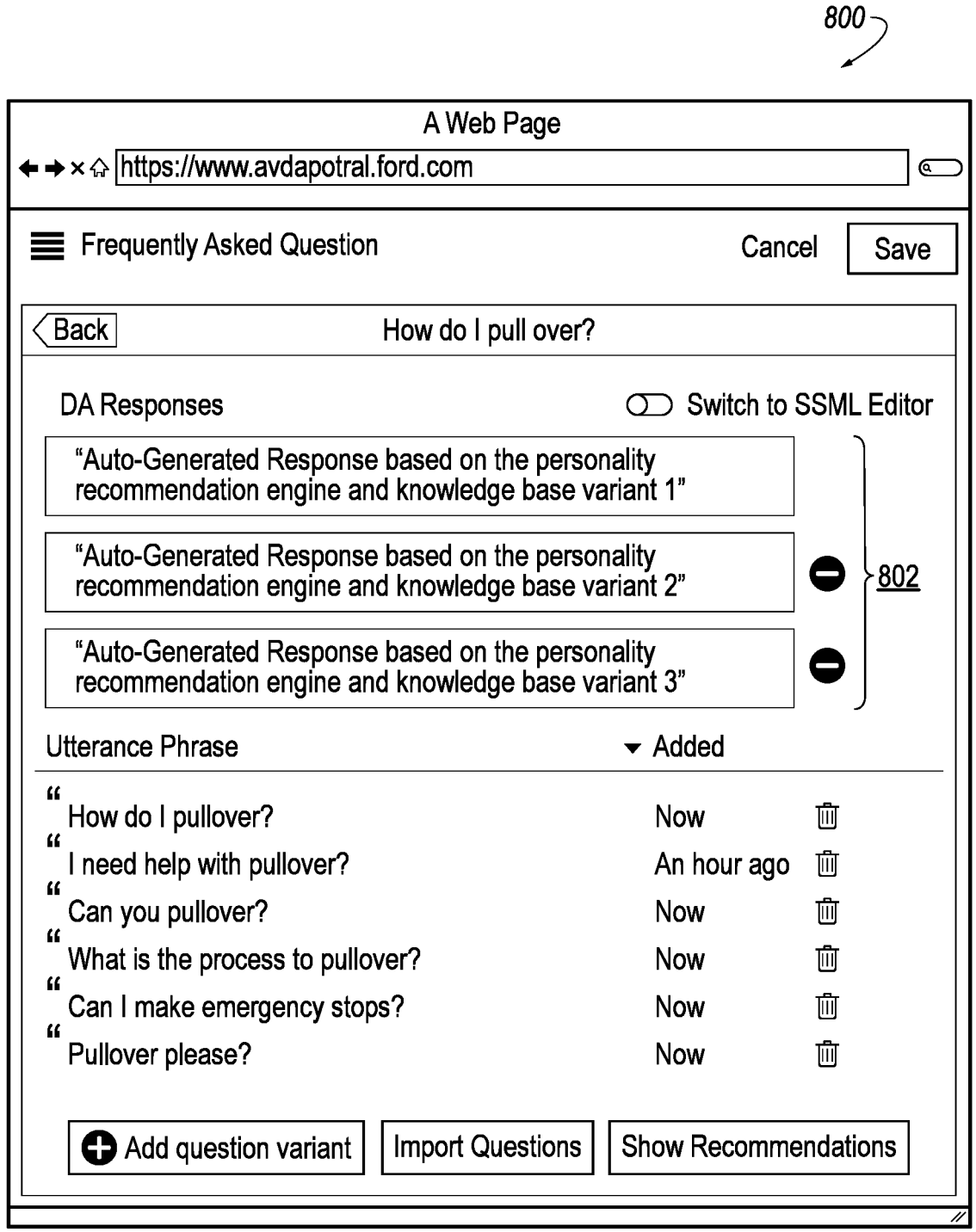
FIG. 8 illustrates an example of auto-generated content for a skill.

FIG. 8 illustrates an example 800 of auto-generated content 304 for a skill. As shown, the skill in the example 800 is a FAQs skill. The example 800 accordingly illustrates a set of digital assistant responses 802 that are autogenerated by the personality studio portal 204. FIG. 9 illustrates an alternate example 900 of auto-generated content 304 for a skill. As shown, the skill in the example 900 is a small talk skill. The example 900 accordingly illustrates a set of digital assistant responses 902 that are autogenerated by the personality studio portal 204 for the small talk skill.

Figure 10:
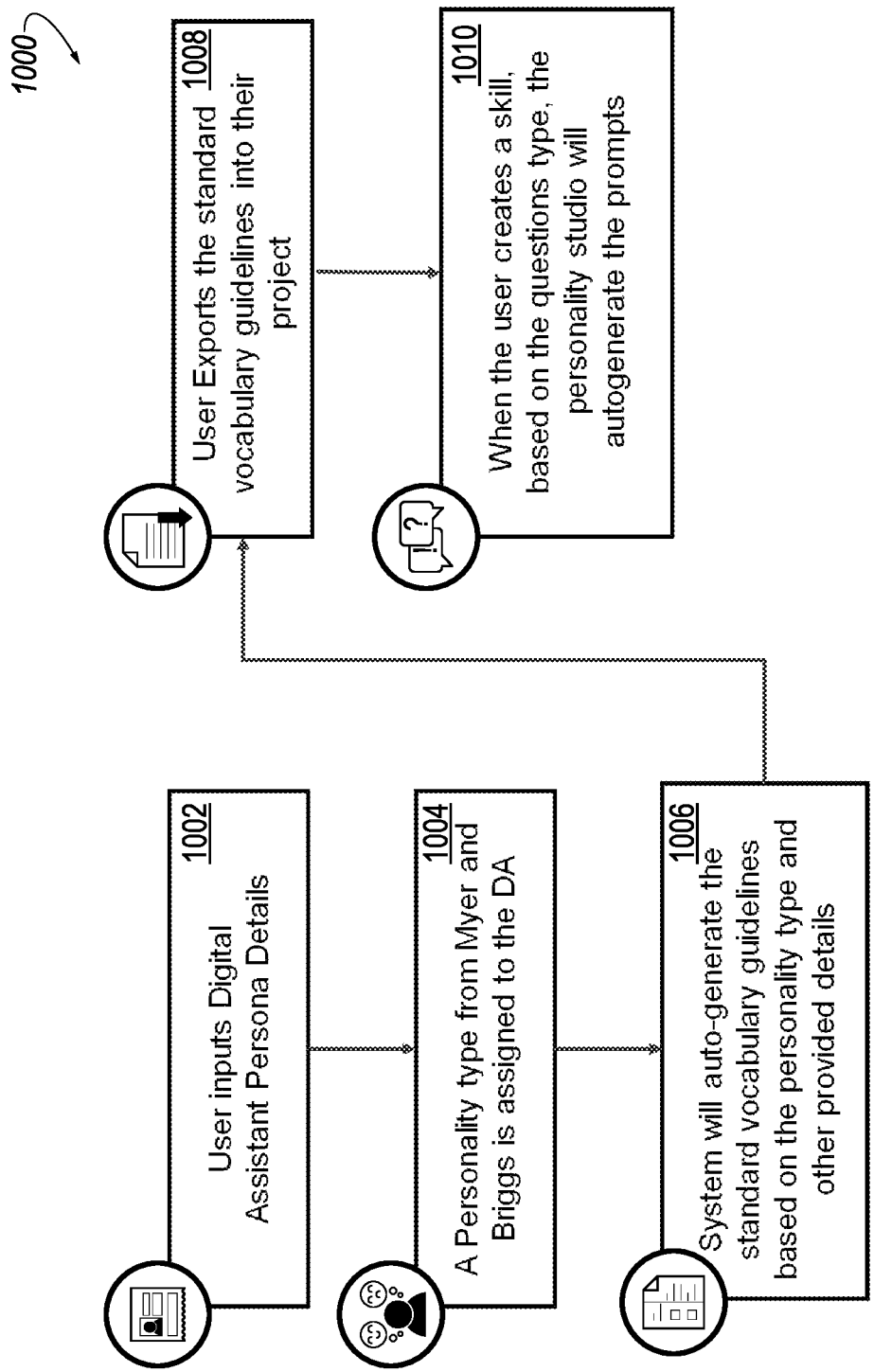
FIG. 10 illustrates an example process for the use of personality studio portal in the creation of a digital assistant persona.

FIG. 10 illustrates an example process 1000 for the use of personality studio portal 408 in the creation of a digital assistant persona 208. In an example, the process 300 may be performed by the digital assistant configuration server 202 in communication with a user accessing the personality studio portal 408 using a mobile device 152. Further aspects of these operations are described in detail herein.

At operation 1002, the digital assistant configuration server 202 receives digital assistant persona 208 details. In an example, these details may be entered in the tool using an interface such as the personality studio user interface 400.

At operation 1004, the digital assistant configuration server 202 generates a personality type. In an example, the personality type is a Myers and Briggs personality types generated based on the persona information provided to the personality studio user interface 400.

At operation 1006, the digital assistant configuration server 202 auto-generates the standard vocabulary 302 and prompts for each skill or domain. In an example, this auto-generation of the persona is performed with the help of personality type.

At operation 1008, the digital assistant configuration server 202 exports the standard vocabulary for use in a project. In an example, this information is exported by use of the export screen 702.

At operation 1010, the digital assistant configuration server 202 autogenerates prompts for a skill based on the question types. Example autogenerated prompts are illustrates in the examples 800 and 900.

Figure 11:
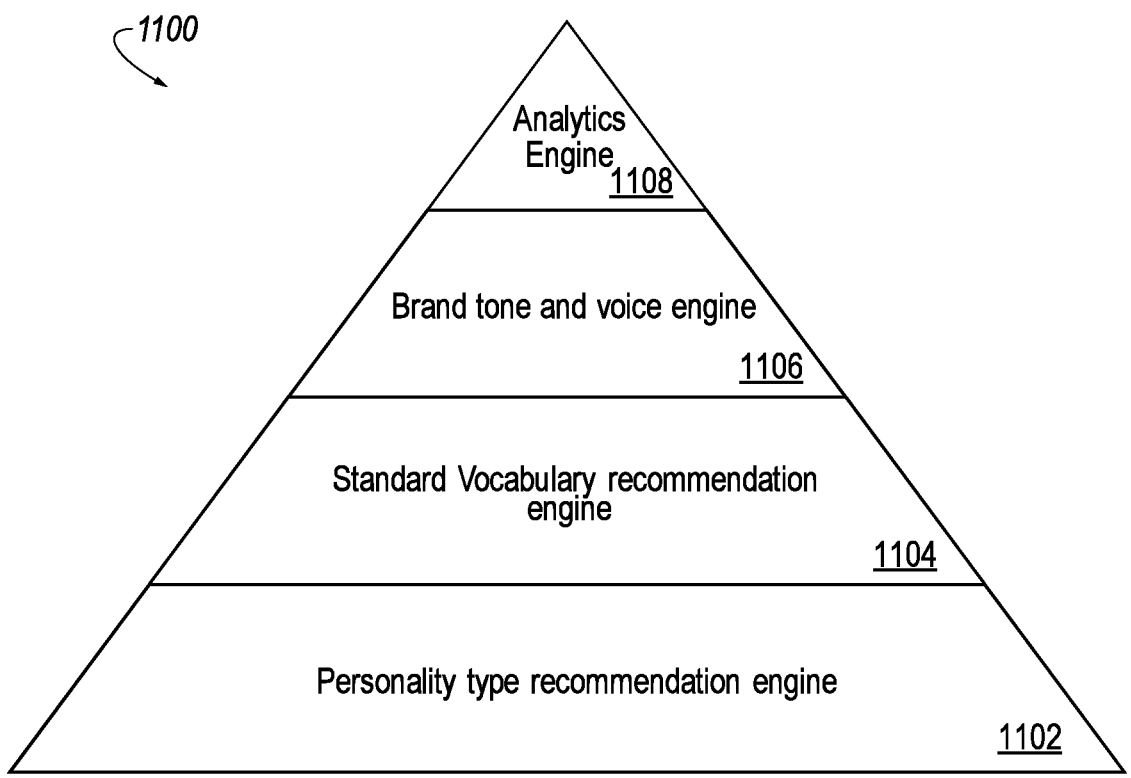
FIG. 11 illustrates an example hierarchical diagram of aspects of the operation of the digital assistant configuration server.

FIG. 11 illustrates an example 1100 hierarchical diagram of aspects of the operation of the digital assistant configuration server 202. This hierarchy includes four aspects: a personality type recommendation engine 1102, a standard vocabulary recommendation engine 1104, a brand tone and voice engine 1106, and an analytics engine 1108. Each of these four recommendation engines 1102, 1104, 1106, 1108 are utilized together help derive aspects of the digital assistant personality 208 described above, including the standard vocabulary 302, the content 304, and the prompt tune 306. To support the operation of these engines 1102, 1104, 1106, 1108, the digital assistant configuration server 202 operates utilizing multiple artificial intelligence algorithms and machine learning techniques/methods.

FIG. 12 illustrates an example 1200 of an un-supervised machine learning approach. As shown, machine learning 1202 is initiated, in which un-supervised learning 1204 operations are performed. The un-supervised learning 1204 involves the grouping and interpretation of the input data, without regard to any outputs. As indicated, clustering 1206 may be utilized. Clustering 1206 refers to a common un-supervised learning technique in which exploratory data analysis is performed to find hidden patterns or groupings in the input data.

Figure 14:
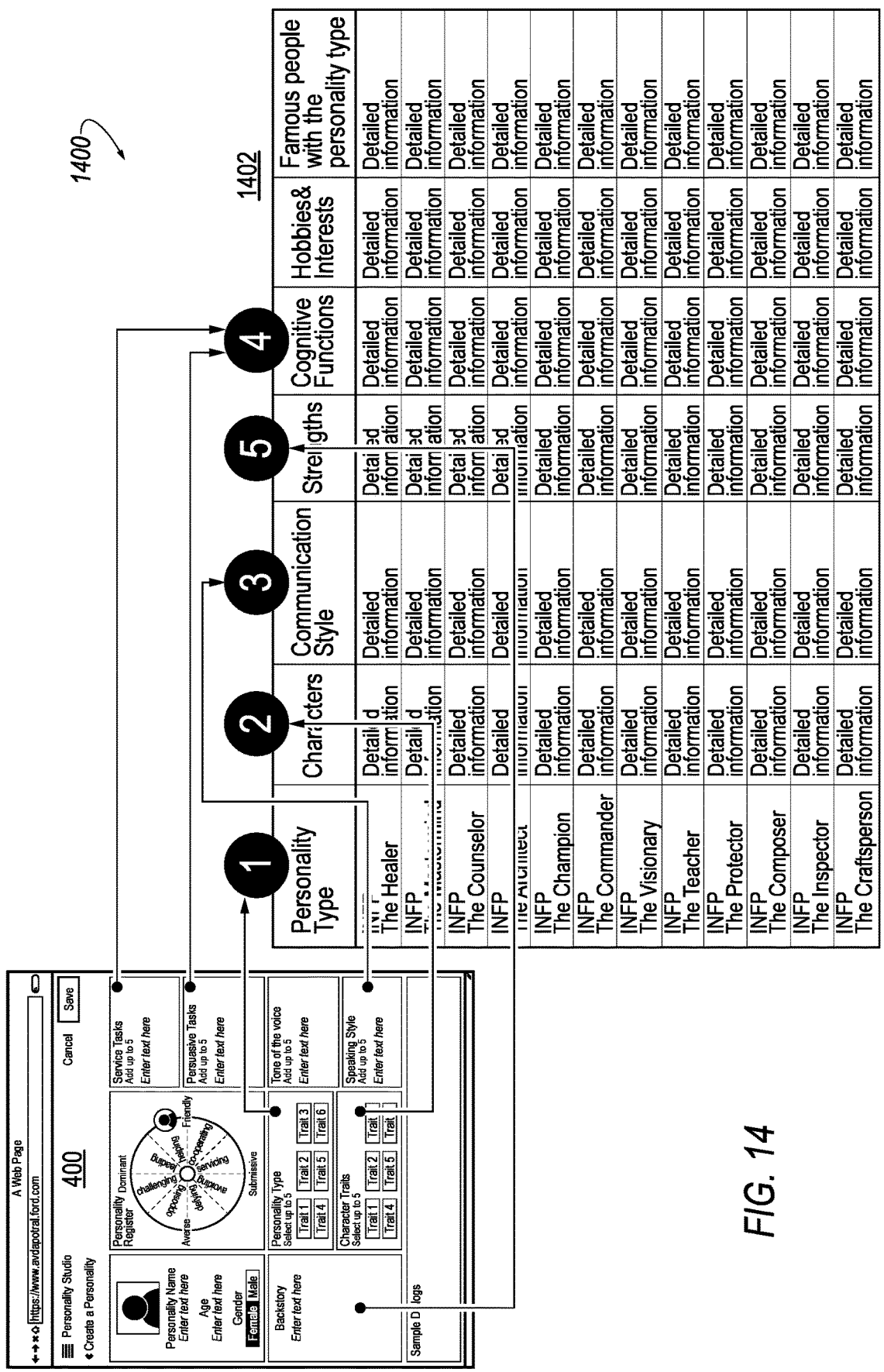
FIG. 14 illustrates an example of a lookup table to find a closest matching personality type based on information entered into the personality studio user interface of the personality studio portal.

FIG. 13 illustrates an example 1300 application of the un-supervised machine learning approach to the personality type recommendation engine 1102. As shown, the personality type recommendation engine 1102 may receive input data 1302. This input data may include the personality type generated based on the user input 206 to the personality studio portal 204. For instance, with reference to FIG. 14, an example 1400 is shown of a lookup table 1402 being used by the personality studio portal 204 to find a closest matching personality type for the data input to the personality studio user interface 400.

Based on the persona information fed into the personality studio user interface 400, the personality studio portal 204 may do a quick lookup of the personality type table to find the right personality type from the available personality types. For each personality type, the lookup table 1402 may include information in detailed information in various categories, such as characteristics of that personality type, communications styles of that personality type, strengths of that personality type, cognitive functions of that personality type, hobbies and interests common to those of that personality type, and famous people sharing that personality type. FIG. 15 illustrates an example of details of the lookup table 1402 for a specific personality type.

Referring back to FIG. 13, the personality type recommendation engine 1102 may also receive training data indexed according to personality type. This may include, as one example, audio recordings, video recordings, and/or articles of various famous celebrities and/or personalities as well as the corresponding personality type of those famous celebrities and/or personalities. This additional information may be used to supplement a corpus of content for use in generating the standard vocabulary 302.

Figure 16:
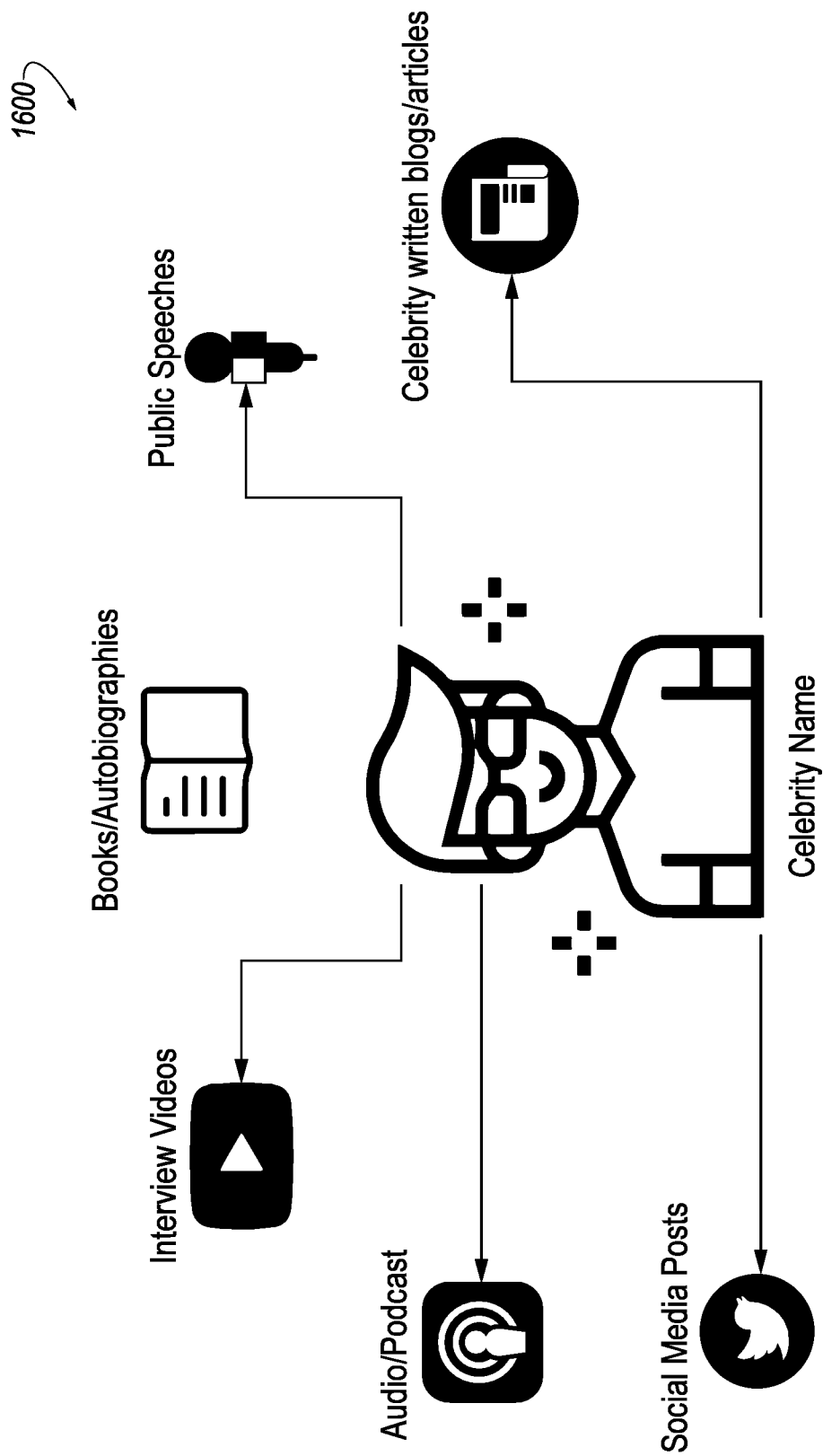
FIG. 16 illustrates an example of training data that may be used as the corpus of content.

FIG. 16 illustrates an example 1600 of training data that may be used as the corpus of content. As shown, some example content about a celebrity to be mined may include social media posts of the celebrity, audio/podcasts of the celebrity, interview videos of the celebrity, books about the celebrity or autobiographies by the celebrity, public speeches by the celebrity, or blogs, articles, or other publications authored by the celebrity.

Referring back to FIG. 13, the personality type recommendation engine 1102 may also receive data to use for pattern matching of the different personality types. This pattern matching information may allow the personality type recommendation engine 1102 to feed the correct information from the training data into the standard vocabulary 302 information for the personality type. In an example, the pattern matching information may include tagging of the training data for specific personality factors that may be present for the indicated personality type.

The personality type recommendation engine 1102 may utilize this input data 1302 to generate un-supervised results 1304. These un-supervised results 1304 may include references to the information in the training data that can be used to build to the standard vocabulary 302.

Figure 17:
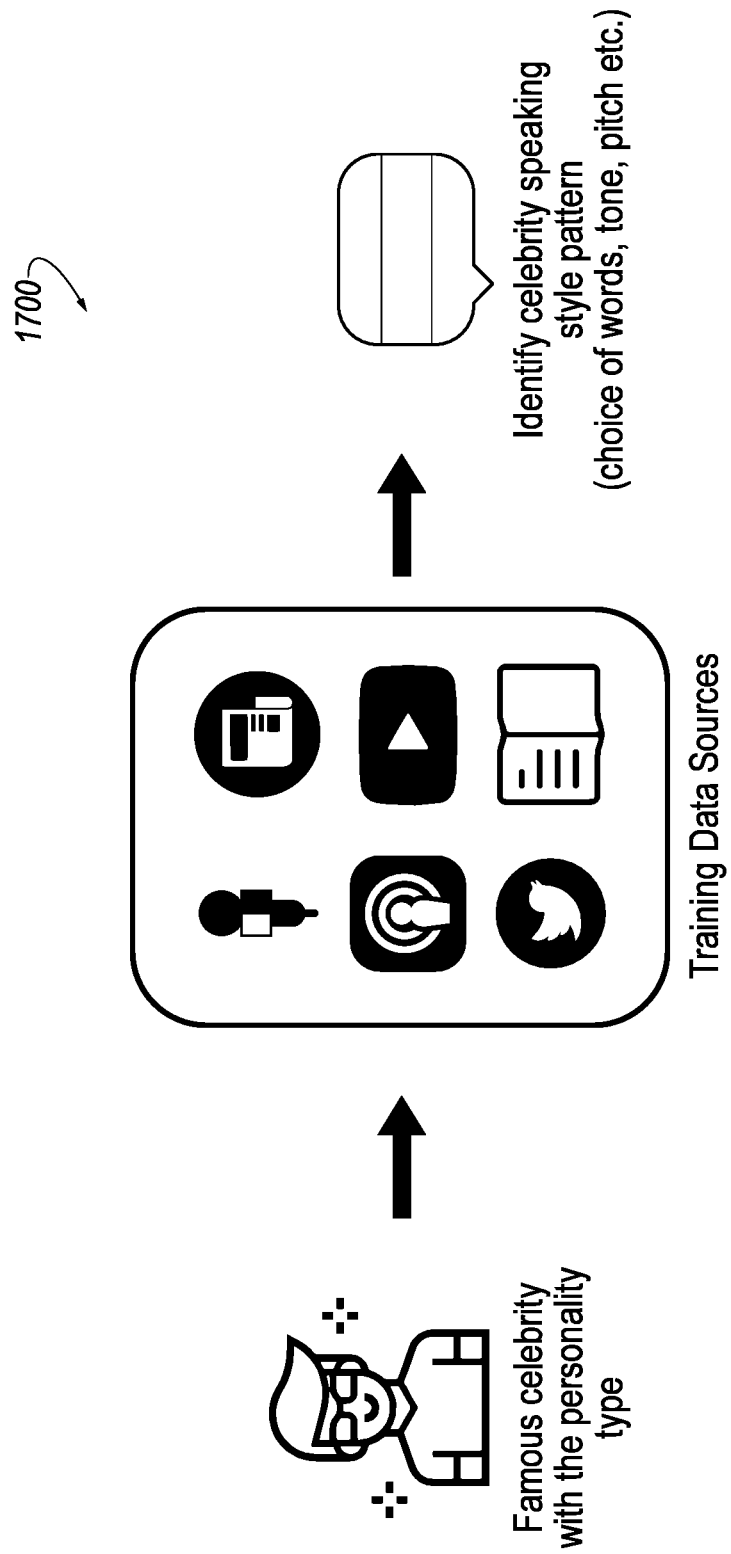
FIG. 17 illustrates an example of data collection for the training performed by the personality type recommendation engine.

FIG. 17 illustrates an example of data collection for the training performed by the personality type recommendation engine 1102. As shown, using the training data sources shown in FIG. 16 that conform to each personality type, the personality type recommendation engine 1102 may collect celebrity speaking style patterns, such as choice of words, tone, pitch, etc.

FIG. 18 illustrates an example of un-supervised learning performed by the personality type recommendation engine 1102. As shown, using the data collection illustrated in FIG. 17, the personality type recommendation engine 1102 perform the un-supervised learning via a neural network based on a pattern recognition (e.g., clustering, etc.) with respect to commonalities in speaking style patterns, such as choice of words, tone, pitch, etc., across celebrities having a given personality type. This information may be used to augment the prompt tune 306 information keyed off the digital assistant persona 208 created by the user with the common information for individuals having that personality type.

FIG. 19 illustrates an example 1900 of a supervised machine learning approach. As shown, machine learning 1902 is initiated, in which supervised learning 1904 operations are performed. The supervised learning 1904 involves developing a predictive model based on both the input data and the generated outputs. As indicated, classification 1906 may be utilized. Clustering 1206 refers to techniques that may be used to predict discrete responses based on a trained classification input data into categories.

FIG. 20 illustrates an example 2000 of an application of the supervised machine learning approach to the brand tone and voice engine 1106. As shown, the brand tone and voice engine 1106 may receive input data 2002. This input data 2002 may include corporate brand guidelines, such as personality traits that a brand owner wishes for a digital assistant persona to possess. The input data 2002 may further include pre-created corporate dialog for digital assistant personas that embody the personality traits desired by the brand owner. This corporate dialog may be created by brand specialists, but may be taken advantage of not only as base content, but also as data indicative of the personality traits desired by the broad, separate from the words of the content itself.

Figure 21:
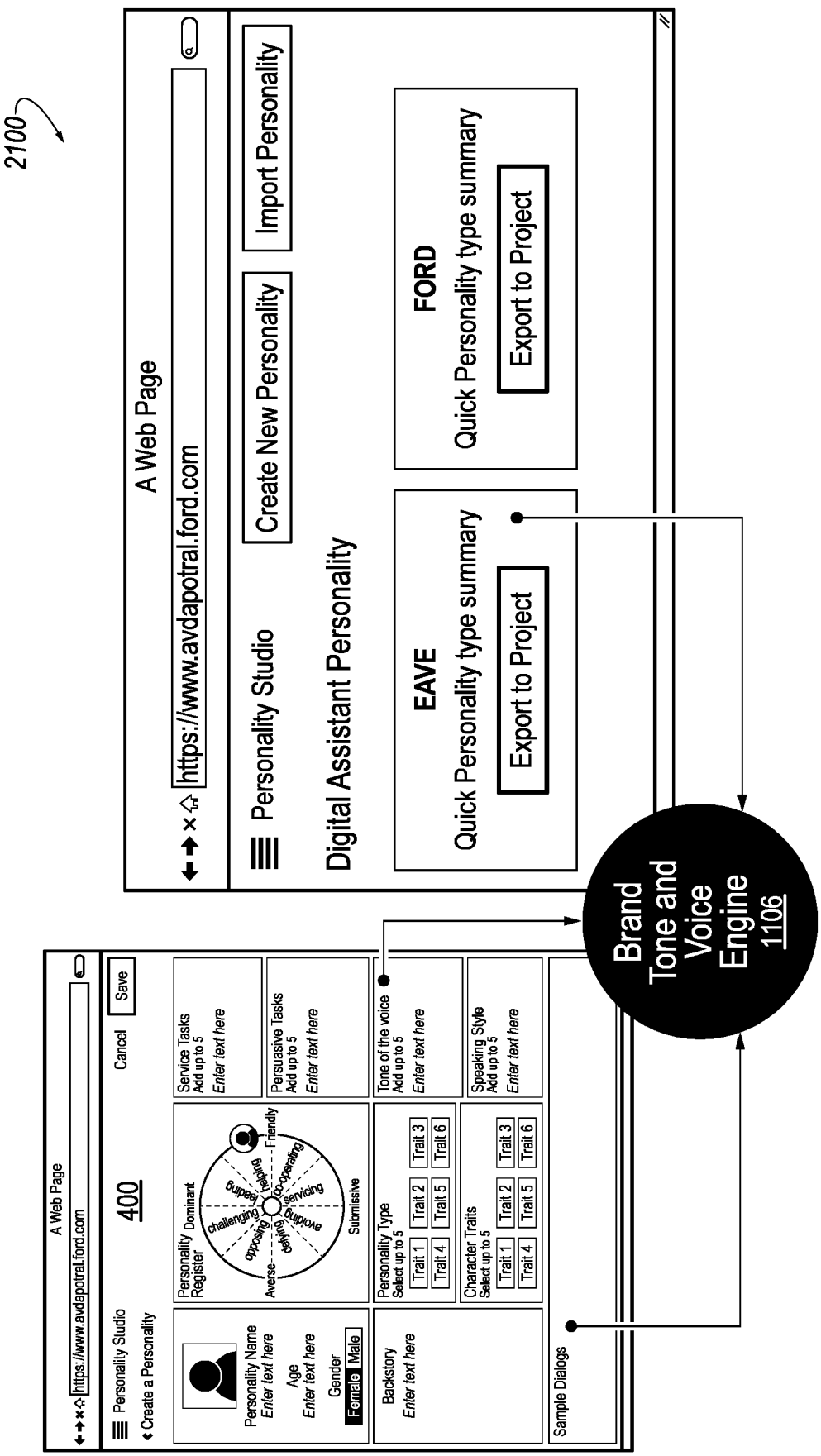
FIG. 21 illustrates an example of the brand tone and voice engine utilizing the corporate brand guidelines from a brand as well as digital assistant persona information entered via the personality studio user interface.

FIG. 21 illustrates an example 2100 of the brand tone and voice engine 1106 utilizing the corporate brand guidelines from a brand as well as digital assistant persona information entered via the personality studio user interface 400. The brand tone and voice engine 1106 may utilize this information to classify the input data 2002 to aid in classifying new dialog to identify content that is consistent with the corporate brand guidelines.

Figure 22:
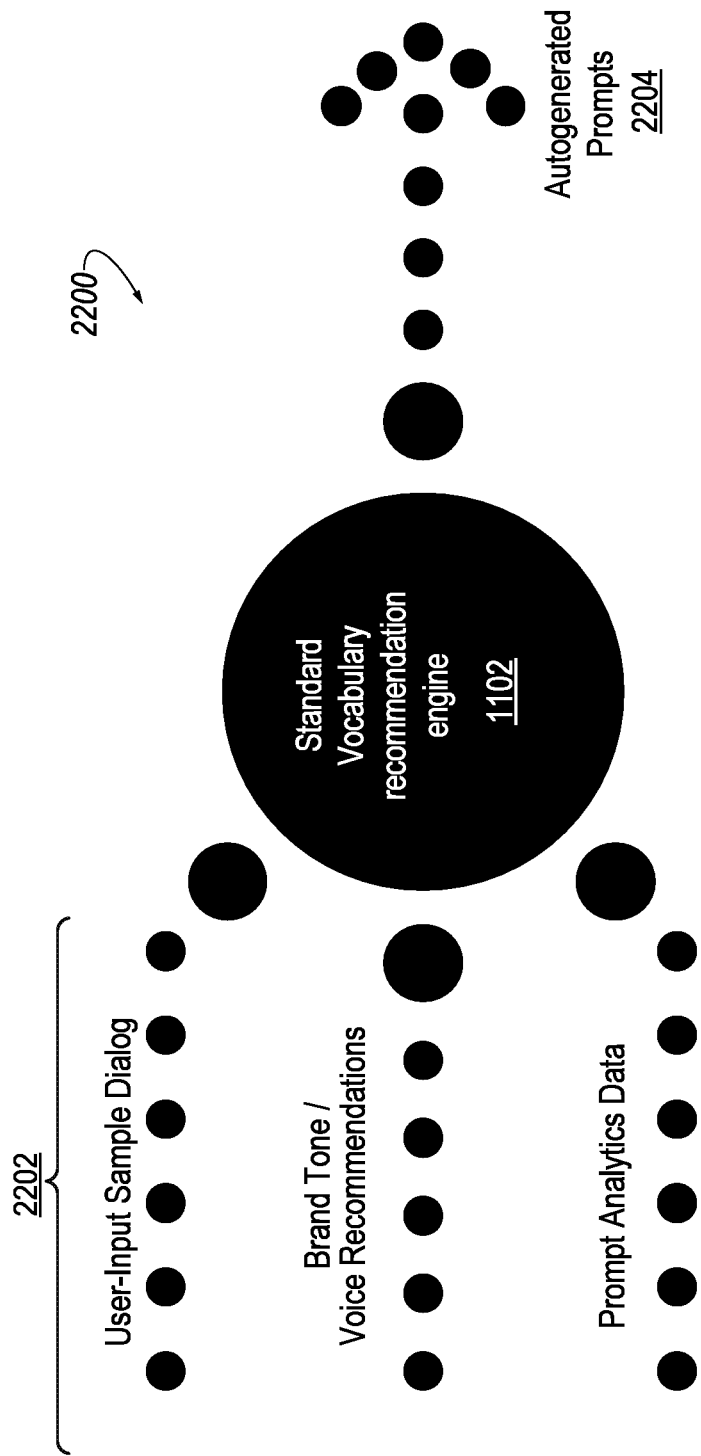
FIG. 22 illustrates an example of an application of the supervised machine learning approach to the standard vocabulary recommendation engine.

FIG. 22 illustrates an example 2200 of an application of the supervised machine learning approach to the standard vocabulary recommendation engine 1102. As shown, the standard vocabulary recommendation engine 1102 may receive inputs 2202 such as user-input sample dialog that may feed the user's words into the machine learning algorithm. The input data 2202 may also include the outputs 2004 from the brand tone and voice engine 1106, which may include dialog that fits with the tone and voice desired by the brand. The input data 2202 may also include prompt analytics data, which may include prompt edits, positive or negative feedback on prompts based on user testing, or other information that may be used to help gauge the likeability of dialog to a user. The result of this information may be autogenerated prompts 2204. These autogenerated prompts 2204 may be exported into a project, and used as the basis for dialog for a skill, where the dialog conforms with the user's personality type as well as with the brand's desired tone and voice.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for auto-generation of dialog for a skill executed by a digital assistant, comprising:
   a server programmed to:
   receive details descriptive of a digital assistant persona from a personality studio user interface via a textual input, wherein the details descriptive of the digital assistant persona includes service tasks that the digital assistant is defined to perform;
   generate a personality type based on the details by analyzing the textual input using language processing;
   auto-generate a standard vocabulary using the personality type;
   export the standard vocabulary for use in a skill; and
   auto-generate prompts for the skill based on the standard vocabulary.

2. The system of claim 1, wherein the details descriptive of a digital assistant persona are received over a network from a mobile device, and the prompts for the skill are provided to a vehicle for use by a digital assistant of the vehicle.

3. The system of claim 1, wherein the details descriptive of a digital assistant persona includes one or more of:
   general information including name, age, and gender of the digital assistant;
   a backstory including background information about the digital assistant;
   a personality register including information indicative of personality aspects of the digital assistant;
   a personality type indicating personality traits of the digital assistant;
   character traits indicating character traits;
   persuasive tasks that the digital assistant is defined to perform;
   tone of voice that the digital assistant is defined to use;
   speaking style that the digital assistant is defined to use; or
   sample dialog including example conversation between the digital assistant and users.

4. The system of claim 1, wherein the server is programmed to:
- identify a personality type for the digital assistant persona based on the details descriptive of the digital assistant persona received from the personality studio user interface;
- execute a personality type recommendation engine to supplement details for the digital assistant persona based on the personality type and information from celebrities having the same personality type;
- execute a brand and tone recommendation engine to determine brand and tone recommendations from corporate brand guidelines and sample corporate dialog for a digital assistant persona, the brand and tone recommendations indicating how content is provided independent to the content being provided; and
- execute a standard vocabulary recommendation engine to create autogenerated prompts using sample dialog, the brand and tone recommendations, and prompt analytics data.

5. The system of claim 4, wherein the brand and tone recommendations indicate one or more of tone of voice, pitch of voice, speed of speech, and pronunciation of words.

6. The system of claim 1, wherein the standard vocabulary includes elements that make up prompts from the digital assistant to a user, the elements including one or more of: introductions, acknowledgments, confirmations, error handling, discourse markers, unsuccessful task indications, apologies, empathy statements, tapering questions, and confirmations.

7. A method for auto-generation of dialog for a skill executed by a digital assistant, comprising:
- receiving details descriptive of a digital assistant persona from a personality studio user interface, wherein the details descriptive of the digital assistant persona includes a backstory including background information about the digital assistant input as text by a user;
- generating a personality type based on the details;
- auto-generating a standard vocabulary using the personality type;
- exporting the standard vocabulary for use in a skill; and
- auto-generating prompts for the skill based on the standard vocabulary.

8. The method of claim 7, wherein the details descriptive of a digital assistant persona are received over a network from a mobile device, and the prompts for the skill are provided to a vehicle for use by a digital assistant of the vehicle.

9. The method of claim 7, wherein the details descriptive of a digital assistant persona includes one or more of:
- general information including name, age, and gender of the digital assistant;
- a personality register including information indicative of personality aspects of the digital assistant;
- a personality type indicating personality traits of the digital assistant;
- character traits indicating character traits;
- service tasks that the digital assistant is defined to perform;
- persuasive tasks that the digital assistant is defined to perform;
- tone of voice that the digital assistant is defined to use;
- speaking style that the digital assistant is defined to use; or
- sample dialog including example conversation between the digital assistant and users.

10. The method of claim 7, further comprising:
- identifying a personality type for the digital assistant persona based on the details descriptive of the digital assistant persona received from the personality studio user interface;
- executing a personality type recommendation engine to supplement details for the digital assistant persona based on the personality type and information from celebrities having the same personality type;
- executing a brand and tone recommendation engine to determine brand and tone recommendations from corporate brand guidelines and sample corporate dialog for a digital assistant persona, the brand and tone recommendations indicating how content is provided independent to the content being provided; and
- executing a standard vocabulary recommendation engine to create autogenerated prompts using sample dialog, the brand and tone recommendations, and prompt analytics data.

11. The method of claim 10, wherein the brand and tone recommendations indicate one or more of tone of voice, pitch of voice, speed of speech, and pronunciation of words.

12. The method of claim 7, wherein the standard vocabulary includes elements that make up prompts from the digital assistant to a user, the elements including one or more of: introductions, acknowledgments, confirmations, error handling, discourse markers, unsuccessful task indications, apologies, empathy statements, tapering questions, and confirmations.

13. A non-transitory computer-readable medium comprising instructions that, when executed by a computing device, cause the computing device to perform auto-generation of dialog for a skill executed by a digital assistant, including to:
- receive details descriptive of a digital assistant persona from a personality studio user interface via a textual input transcribed from a user speech;
- generate a personality type based on the details;
- auto-generate a standard vocabulary using the personality type;
- export the standard vocabulary for use in a skill; and
- auto-generate prompts for the skill based on the standard vocabulary.

14. The medium of claim 13, wherein the details descriptive of a digital assistant persona are received over a network from a mobile device, and the prompts for the skill are provided to a vehicle for use by a digital assistant of the vehicle.

15. The medium of claim 13, wherein the details descriptive of a digital assistant persona includes one or more of:
- a backstory including at least one of: existence of a sibling, or educational background;
- service tasks that the digital assistant is defined to perform;
- persuasive tasks that the digital assistant is defined to perform;
- tone of voice that the digital assistant is defined to use;
- speaking style that the digital assistant is defined to use; or
- sample dialog including example conversation between the digital assistant and users.

16. The medium of claim 13, further comprising instructions that, when executed by the computing device, cause the computing device to perform operations including to:
- identify a personality type for the digital assistant persona based on the details descriptive of the digital assistant persona received from the personality studio user interface;

execute a personality type recommendation engine to supplement details for the digital assistant persona based on the personality type and information from celebrities having the same personality type;

execute a brand and tone recommendation engine to determine brand and tone recommendations from corporate brand guidelines and sample corporate dialog for a digital assistant persona, the brand and tone recommendations indicating how content is provided independent to the content being provided; and execute a standard vocabulary recommendation engine to create autogenerated prompts using sample dialog, the brand and tone recommendations, and prompt analytics data.

17. The medium of claim 16, wherein the brand and tone recommendations indicate one or more of tone of voice, pitch of voice, speed of speech, and pronunciation of words.

18. The medium of claim 13, wherein the standard vocabulary includes elements that make up prompts from the digital assistant to a user, the elements including one or more of: introductions, acknowledgments, confirmations, error handling, discourse markers, unsuccessful task indications, apologies, empathy statements, tapering questions, and confirmations.

19. The medium of claim 13, wherein the details descriptive of a digital assistant persona includes a backstory including existence of a sibling, and educational background.

20. The medium of claim 13, wherein the details descriptive of a digital assistant persona includes speaking style that the digital assistant is defined to use.

\* \* \* \* \*